United States Patent
Haynes et al.

(10) Patent No.: US 7,071,841 B2
(45) Date of Patent: Jul. 4, 2006

(54) TRUCK ACOUSTIC DATA ANALYZER SYSTEM

(75) Inventors: Howard D. Haynes, Knoxville, TN (US); Alfred Akerman, Knoxville, TN (US); Curtis W. Ayers, Kingston, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/922,023

(22) Filed: Aug. 19, 2004

(65) Prior Publication Data

US 2006/0037400 A1    Feb. 23, 2006

(51) Int. Cl.
G08G 1/04   (2006.01)
G08G 1/052  (2006.01)
G08G 1/054  (2006.01)
G08G 1/056  (2006.01)

(52) U.S. Cl. ............ 340/943; 701/119; 367/127; 73/587

(58) Field of Classification Search ............ 73/587, 73/579; 702/75–76; 340/933–934, 943, 340/905; 367/135–136, 127; 701/117–119
See application file for complete search history.

(56) References Cited

U.S. PATENT DOCUMENTS

| | | | |
|---|---|---|---|
| 3,445,637 A | 5/1969 | Auer, Jr. | |
| 3,920,967 A | 11/1975 | Martin et al. | |
| 4,333,170 A * | 6/1982 | Mathews et al. | 367/125 |
| 4,558,439 A * | 12/1985 | Gudesen | 367/127 |
| 4,806,931 A | 2/1989 | Nelson | |
| 5,008,666 A | 4/1991 | Gebert et al. | |
| 5,060,206 A | 10/1991 | de Metz, Sr. | |
| 5,161,127 A * | 11/1992 | Grosch | 367/124 |
| 5,619,616 A * | 4/1997 | Brady et al. | 706/20 |
| 5,878,367 A * | 3/1999 | Lee et al. | 701/117 |
| 6,204,778 B1 | 3/2001 | Bergan et al. | |
| 6,418,371 B1 * | 7/2002 | Arnold | 701/117 |
| 6,504,490 B1 * | 1/2003 | Mizushima | 340/943 |
| 2005/0100172 A1 * | 5/2005 | Schliep et al. | 381/71.4 |

FOREIGN PATENT DOCUMENTS

| | | |
|---|---|---|
| DE | 10064757 A1 * | 7/2002 |
| JP | 05114097 A * | 5/1993 |
| JP | 10172090 A * | 6/1998 |
| JP | 2000105274 A * | 4/2000 |
| JP | 2000182198 A * | 6/2000 |

* cited by examiner

Primary Examiner—Hezron Williams
Assistant Examiner—Rose M. Miller
(74) Attorney, Agent, or Firm—Kirk A. Wilson

(57) ABSTRACT

A passive vehicle acoustic data analyzer system having at least one microphone disposed in the acoustic field of a moving vehicle and a computer in electronic communication the microphone(s). The computer detects and measures the frequency shift in the acoustic signature emitted by the vehicle as it approaches and passes the microphone(s). The acoustic signature of a truck driving by a microphone can provide enough information to estimate the truck speed in miles-per-hour (mph), engine speed in rotations-per-minute (RPM), turbocharger speed in RPM, and vehicle weight.

15 Claims, 7 Drawing Sheets

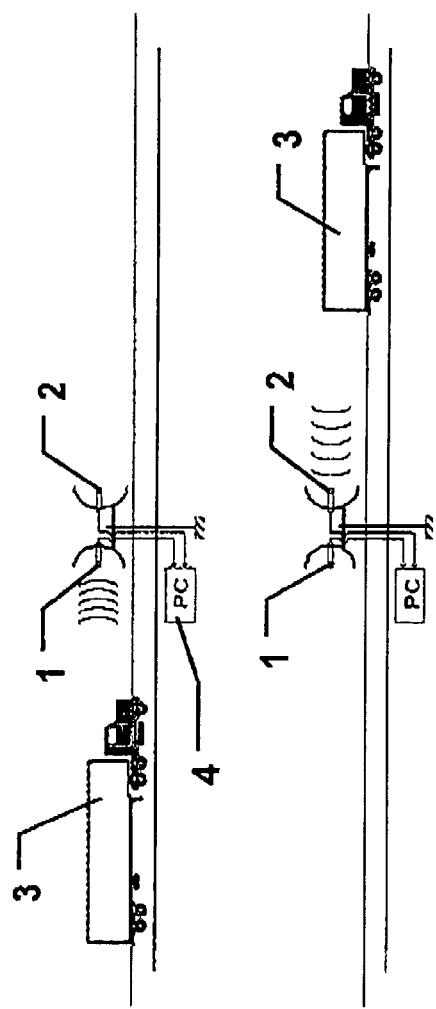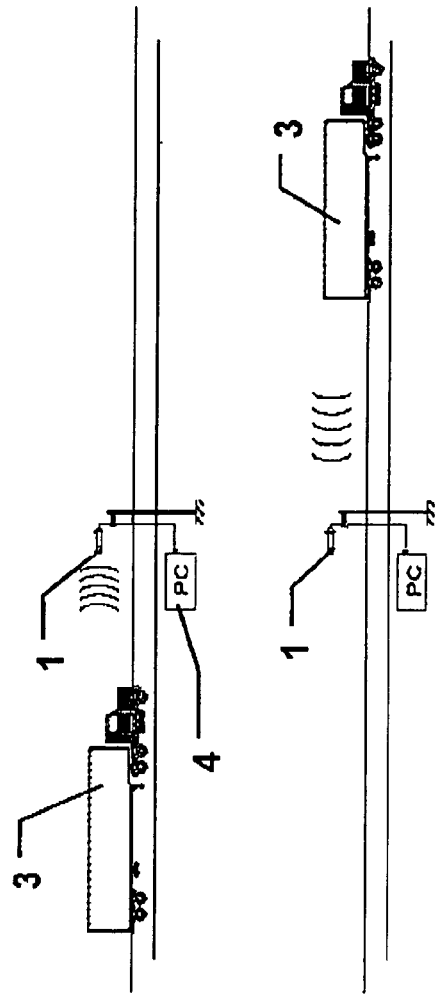

TRUCK ACOUSTIC DATA ANALYZER SYSTEM

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

This invention relates to traffic monitoring systems including warning systems and vehicle speed detection systems, for monitoring commercial vehicles.

DESCRIPTION OF THE BACKGROUND ART

Speeds of traveling vehicles can be measured via radar or laser. A normal radar gun used by law enforcement agencies sends out a radio pulse and waits for the reflection. It then measures the frequency shift in the signal and uses the Doppler effect to determine the speed of the vehicle. Speed guns based on lasers also can measure vehicle speed, but they rely on the reflection time of light rather than the Doppler effect.

Rotational speeds of engines and turbochargers are measured by either sensing the resulting structural vibrations using a vibration sensor such as an accelerometer, or by using a non-contact strobe-based tachometer, when a rotating surface is visible. When a rotating surface is not visible, the strobe-tachometer cannot be used.

Different kinds of monitoring systems have been used to monitor traffic with the most prevalent system being a roadway metal detector. In such system, a wire loop was embedded in the roadway and its terminals were connected to detection circuitry that measured the inductance changes in the wire loop. Because the inductance in the wire loop was perturbed by a motor vehicle (which included a quantity of ferromagnetic material) passing over it, the detection circuitry detected when a motor vehicle was over the wire loop. Based on this perturbation, the detection circuitry created a binary signal, called a "loop relay signal", which was transmitted to the command center of the highway department. The command center gathered the respective loop relay signals and from these made a determination as to the likelihood of congestion. The use of wire loops was, however, disadvantageous for several reasons.

First, a wire loop system did not detect a motor vehicle unless the motor vehicle included sufficient ferromagnetic material to create a noticeable perturbation in the inductance in the wire loop. Because the trend now is to fabricate motor vehicles with non-ferromagnetic alloys, plastics and composite materials, wire loop systems will increasingly fail to detect the presence of motor vehicles. It is already well known that wire loops often overlook small vehicles. Another disadvantage of wire loop systems was that they were expensive to install and maintain. Installation and repair required that a lane be closed, that the roadway be cut and that the cut be sealed. Often too, harsh weather precluded this operation for several months.

Non-invasive traffic monitoring systems have been suggested, among them being U.S. Pat. No. 3,445,637, patented May 20, 1969 by J. M. Auer, Jr., provided apparatus for measuring traffic density in which a sonic detector produced a discrete signal which was inversely proportional only to vehicle speed for each passing vehicle.

U.S. Pat. No. 3,920,967, patented Nov. 18, 1975, by D. T. Martin et al, provided a computerized traffic control apparatus for controlling the flow of vehicular traffic through a network of intersections. Detectors in proximity to selected intersections generated electrical signals which were representative of the commencement and termination of vehicle presence. One or more field preprocessors received these signals and responsively generated secondary signals which were representative of vehicle count and speed. These secondary signals were transmitted to a computer which analyzed them and responsively generated control signals which were transmitted to, and governed, the sequential operation of traffic signal heads at controlled intersections.

U.S. Pat. No. 4,806,931, patented Feb. 21, 1985, by T. M. Nelson, provided a sound pattern discrimination system. The patented system was provided for the detection and recognition of pre-established sound patterns, e.g., the various patterns produced by the sirens of emergency vehicles. Directional information along with the output of a Schmitt trigger was supplied to a microprocessor which was used to control the signal lights at an intersection in response to the detected siren.

U.S. Pat. No. 5,060,206, patented Oct. 22, 1991 by F. C. de Metz Sr., provided a marine acoustic detector for use in identifying a characteristic airborne sound pressure field which was generated by a propeller-driven aircraft.

U.S. Pat. No. 5,008,666, patented Apr. 16, 1991, by F. J. Gebert et al., disclosed traffic measurement equipment employing a pair of coaxial cables and a presence detector for providing measurements including vehicle count, vehicle length, vehicle time of arrival, vehicle speed, number of axles per vehicle, axle distance per vehicle, vehicle gap, headway and axle weights.

U.S. Pat. No. 6,204,778 issued to Bergan et al. on Mar. 20, 2001, uses electro-acoustic sensor arrays that are specifically mounted above the road to sense the sounds produced by motor vehicles as they pass under the sensor arrays. The arrays are used to detect when a vehicle is within the zone under the sensor arrays. The system determines if the motor vehicle is a truck by comparing the MAGNITUDE of the sound within a predetermined frequency band to a threshold level using a band-pass filter. The speed of the vehicle is determined by the length of time for the vehicle to enter the detection zone of the above-road electro-acoustic sensor arrays thereby teaching a vehicle speed detection method that is acoustic-based and dependent on the MAGNITUDE of the vehicle's sound within a predetermined frequency band.

SUMMARY OF THE INVENTION

This invention acquires and analyzes the acoustic signature given off by a large truck or other vehicle as it travels down the highway. Tests have demonstrated that the acoustic signature of a truck driving by an acoustic sensor (microphone) can provide enough information to estimate the truck speed in miles-per-hour (mph), engine speed in rotations-per-minute (RPM), and turbocharger speed in RPM. The Truck Acoustic Data Analyzer (TADA) system provides a new means of remotely detecting these parameters for a variety of potential purposes, such as monitoring the speed of trucks and other vehicles in a manner that would be undetectable by the drivers of those vehicles. In addition, the three speed parameters measured by the TADA are altogether indicative of how heavily loaded the vehicle is and provide a means for measuring vehicle weight. These can also be useful in measuring/monitoring vehicles remotely in an undetectable way. Hardware needed by the portable system is minimal, and consists of that which is needed to record a standard sound file, for example a Windows® sound file, as the truck drives by the measurement location. Specially-developed software then analyzes the sound file and provides the speed measurements, as well as determining data quality in order to maximize the reliability of the speed measurements.

BRIEF DESCRIPTION OF THE DRAWINGS

FIG. 1 is a schematic of a two microphone embodiment of the TADA.

DETAILED DESCRIPTION OF THE PREFERRED EMBODIMENTS

The TADA system is comprised of hardware and software, which together provide the full functioning capabilities of the system. FIGS. 1a and 1b illustrate embodiments of the system that can be used to obtain remote measurements of truck speeds. In FIG. 1a, two microphones 1 and 2 are oriented in opposite directions so that microphone one 1 is preferentially sensitive to the truck 3 as it approaches the measurement location and microphone two 2 is oriented so that it is preferentially sensitive to the truck 3 as it retreats from the measurement location. The use of two microphones is not required, but has given very good results. One microphone, as shown in FIG. 1b, has also been used successfully and would be acceptable. Whether one or two microphones are used, the intent is to produce a single electrical signal that is representative of the sound of the truck 3 as it approaches and passes the measurement location. If one microphone is used, it should be recorded as a monophonic (single channel) sound file, one example being in the standard Windows® WAV file format. If two microphones are used, their signals should be mixed (either via analog or digital methods) so that a single channel signal is produced. This signal should then be saved in the same format.

The monophonic WAV file that results from this operation is then of an acceptable format to be analyzed by the TADA software, that runs on a standard Windows® computer depicted in FIG. 1 as PC 4. The software was developed to analyze the acoustic signature given off by a large truck or other vehicle as it passes by a microphone. Tests have demonstrated that the acoustic signature of a passing truck can provide enough information to estimate the truck's speed in miles-per-hour (mph), its engine speed in rotations-per-minute (RPM), and its turbocharger speed in RPM. In addition, the software provides a data quality indication to maximize the reliability of the speed estimates.

Figure 2:
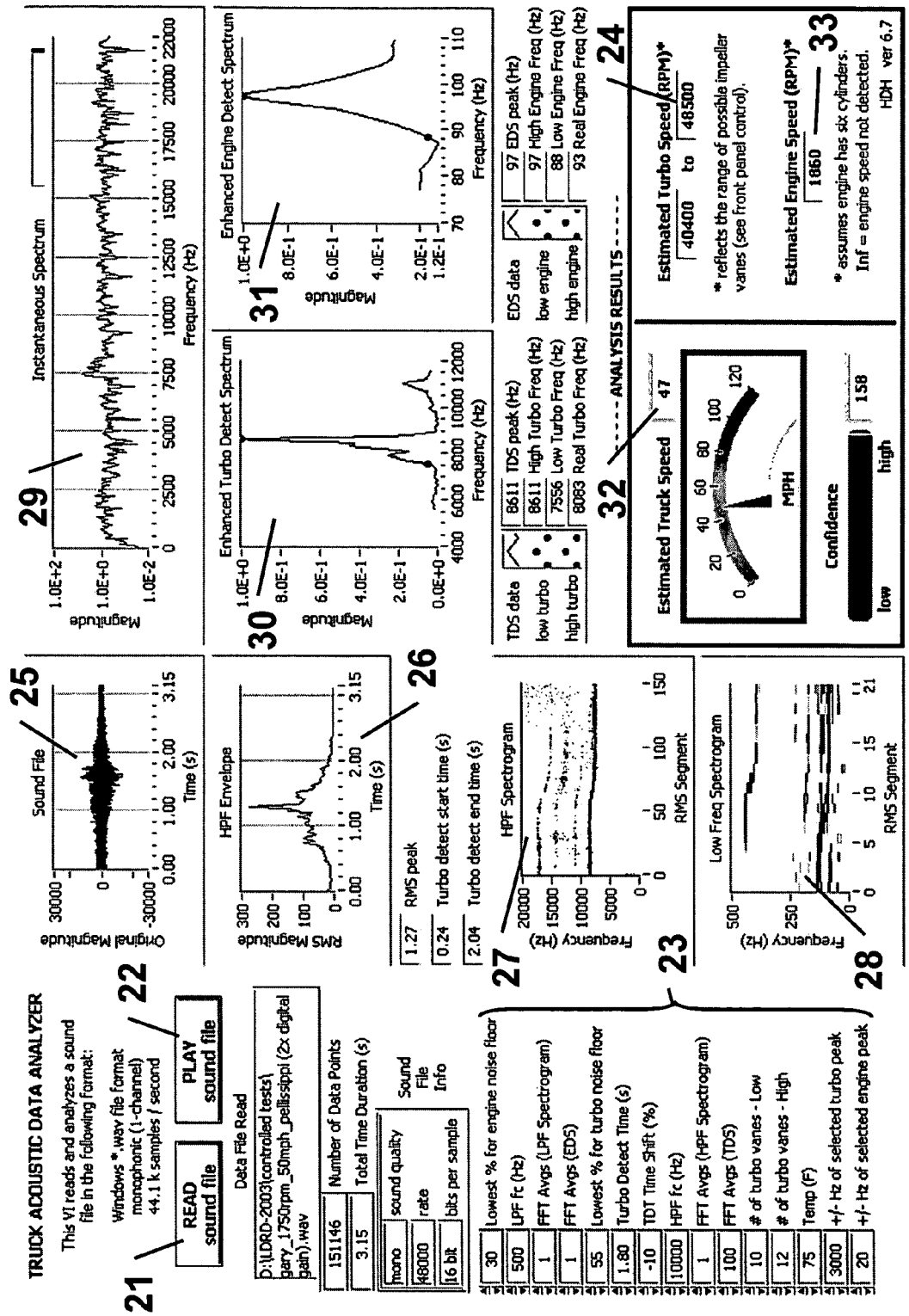
FIG. 2 is a computer user interface of the TADA.

FIG. 2 illustrates the user interface of the Truck Acoustic Data Analyzer (TADA) software. The TADA was developed using LabVIEW™, a product of National Instruments™. LabVIEW™ provides an advanced software development platform for data acquisition and analysis applications.

As seen in FIG. 2, a variety of controls and displays are provided. They includes: 1) A button to read 21 the WAV-format sound file to analyze, 2) A button to play 22 the sound file, 3) Controls for modifying many of the signal processing settings 23 of the software, 3) Controls for entering the range of possible turbocharger vanes 4) Displays for viewing the sound file signature—including waveform 25, HPF envelope 26, HPF spectrogram 27 and LPF spectrograms 28, instantaneous spectrum 29, and two spectral displays for, showing enhanced turbocharger 30 and engine sound 31 frequency content.

After pressing the read 21 data control button to read the truck sound file, the time waveform data are read and displayed as waveform 25. The sound file may then be played if desired, by pressing the play 22 data control button.

This "raw acoustic" data that has been read is then low-pass filtered (LPF) and high-pass filtered (HPF), according to the settings 23 specified by the user. The entire HPF data set is broken up into many smaller, equal-time "blocks" for analysis. From the beginning of the HPF data set to the end, each block is analyzed and displayed in the instantaneous spectrum 29 display. The instantaneous spectrum 29 provides a dynamic illustration of the changes in frequency content of the HPF data set as it is being analyzed. After every block has been read and analyzed, all frequency spectra are combined into one graph, the HPF spectrogram 27. The HPF spectrogram 27 shows the time-dependent variations in spectral content of the entire HPF data file.

The HPF envelope 26 is determined by measuring the root mean square (RMS) of each HPF data block and then plotting the RMS values vs. time. From this HPF envelope, the segment of the HPF data to be further analyzed is determined. The start and end times of this segment, or "window," are automatically determined from the HPF envelope 26 so that the data contained in this window includes truck sounds as the truck is approaching the microphone, passing the microphone, and driving away from the microphone. Within this window the HPF data magnitudes are the largest, and the frequency shifting of the truck sounds can be most effectively studied.

Once the window start and end times have been automatically determined, subsets of the LPF and HPF data sets can be created and analyzed. These subsets now contain the data of greatest interest, and do not contain weak signals, or extraneous signals such as the wind buffeting noise that often occurs after a truck passes the microphone. A LPF spectrogram 28 is generated to show the time-dependent variations in spectral content of the LPF data file.

For both filtered data subsets, the frequency content is automatically studied by the software. Through testing, it was learned that the sound of a truck turbocharger can be identified in the truck's acoustic signature as it drives down the highway. This sound is the actual shaft speed of the turbocharger times the number of vanes used by the turbocharger. Thus, what is heard is the turbocharger's "vane pass" frequency. The frequencies of this sound and other sounds within specified frequency bands of interest are displayed as enhanced turbocharger 30 and engine sound 31 and are seen to contain "peaks" associated with the engine noise and the turbocharger noise. In these displays, each "peak" is in fact not a single frequency, but is "spread out" due to the shifting of the sound frequencies that are detected by the microphone as the truck first approaches, then drives away from the microphone.

Algorithms are provided in the software to detect the highest and lowest frequencies associated with the engine and turbocharger sounds. Since the truck approaches and drives away from the microphone at the same speed (but in different directions), the actual engine and turbocharger frequencies are midway between the highest and lowest values determined by these algorithms.

After determining the actual turbocharger sound frequency, the frequency shift, and the speed of sound in air, the speed of the truck is calculated using the Doppler Equation. The software also provides a means of entering the air temperature in the settings 23. The air temperature measurement is used to more accurately calculate the speed of sound at the measurement location, and enhance the accuracy of the truck speed calculation.

To calculate the actual shaft speed of the turbocharger, the software then divides the actual turbocharger sound frequency by the number of turbocharger vanes input in the settings 23, and then displays the turbocharger speed 24.

Through testing, it was also learned that the engine sound that is heard (and detected by the microphone) is actually three times the actual shaft speed of the engine for the typical six-cylinder engine used in most large trucks. Therefore, the speed of the engine is calculated by dividing the actual engine sound frequency by three, and then multiplying by sixty to express the engine speed in rotations per minute (RPMs). The engine speed 33 results are then displayed.

The overall reliability of the TADA speed calculations is indicated by a "Confidence" factor which is a calculated value based on the signal-to-noise ratio of the turbocharger component in the acoustic spectrum. The Confidence factor is determined by multiplying the average turbocharger peak magnitude by the average magnitude of the noise floor near the turbocharger peak and then dividing this product by the square of the standard deviation of the noise floor. A multiplier of ten is finally applied to produce a number that is roughly scalable from 0 to 100, where 100 represents excellent confidence that the TADA speed calculations are reliable. Experimental results have demonstrated that when the confidence factor is greater than 30, the TADA speed calculations are very reliable. In the example provided, the confidence factor is 158 which indicates excellent reliability.

After a sound file has been processed, the truck speed is estimated by automatically detecting and measuring the frequency shift of the turbocharger vane pass sounds that are almost always present in a large truck that is carrying a load and driving uphill. For that reason, it is preferred that truck sounds be recorded under these conditions.

This shift in frequency is due to the change in relative velocity between the truck and the measurement location (microphone), which is stationary. As the truck approaches the microphone, the velocity of the truck is in the same direction as the sound waves being broadcast towards the microphone. This results in truck sounds that are higher in pitch (frequency) than if the source were stationary. After the truck passes the microphone, it is traveling in the opposite direction as the sound waves being broadcast towards the microphone. This results in truck sounds that are lower in frequency. This shift in frequency is known as the Doppler effect, in honor of Christian Doppler, who first discovered it.

Figure 3:
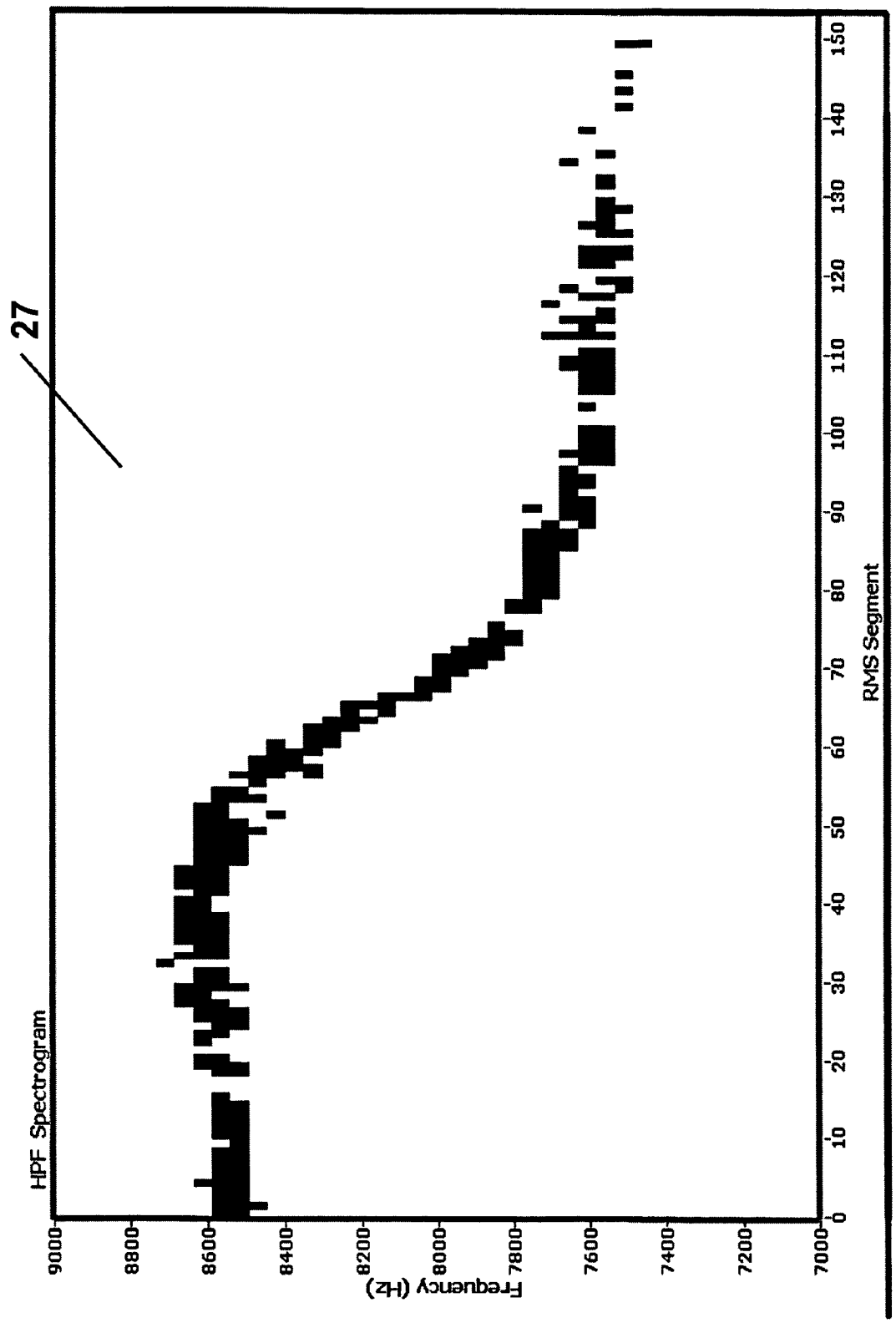
FIG. 3 is an enlarged view of the high-frequency spectrogram from FIG. 2.

FIG. 3 shows an enlarged view of the high-frequency spectrogram from FIG. 2, but after altering the color pallet for clarity. This figure illustrates the shift in the turbocharger vane-pass frequency for a truck that was known to be traveling at approximately 50 mph. The TADA software automatically detected the frequency shift in the turbocharger sound component and estimated the truck speed as 47 mph, which is an acceptable error (6%) when one considers the possible errors in reading the upper and lower turbocharger sound frequencies, and in reading the truck speedometer.

Referring back to FIG. 2, engine speed is estimated based on observations that a typical four-stroke, six-cylinder truck engine produces detectable sound components at three-times and six-times the engine shaft speed. Recognizing that these engine sound components also shift in frequency as the truck drives by the microphone, the upper and lower frequencies are averaged to determine the actual engine sound frequency, from which the engine speed is then calculated using the aforementioned relationship. In this case, the TADA software estimated engine speed to be 1860 RPM 33, which is about 6% higher than the truck tachometer reading (1750 RPM). This error is reasonable when considering the potential calibration error of the tachometer and the possible errors in reading the upper and lower engine sound frequencies.

In a similar manner, the actual turbocharger sound frequency is determined. Since the sound that is heard is the vane-pass frequency, we need to divide the turbocharger sound frequency by the number of turbocharger inlet impeller and/or outlet impeller vanes to calculate the turbocharger shaft speed. From examinations of several vehicle turbochargers, the number of possible impeller vanes in a large truck turbocharger impeller was roughly estimated to be between 10 and 12. The turbocharger speed estimated by the software is therefore expressed as a range, based on the possible number of impeller vanes, which is entered by the user. When the default vane number range (10 to 12) is used, the turbocharger speed is estimated to be between 40400 to 48500 RPM 24. The actual turbocharger speed for this truck was unknown during this test.

Figure 5:
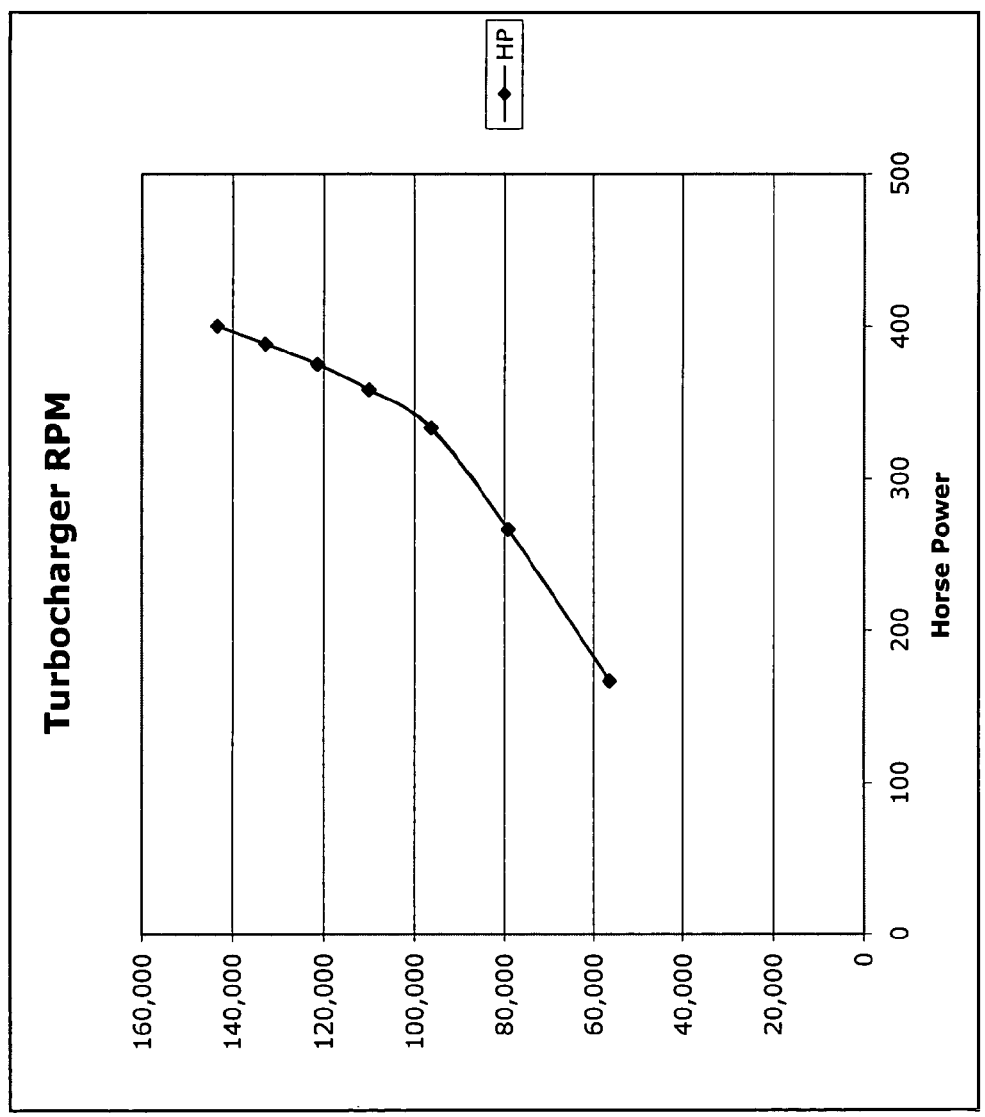
FIG. 5 is a graph of horsepower vs. turbocharger RPM.
Figure 6:
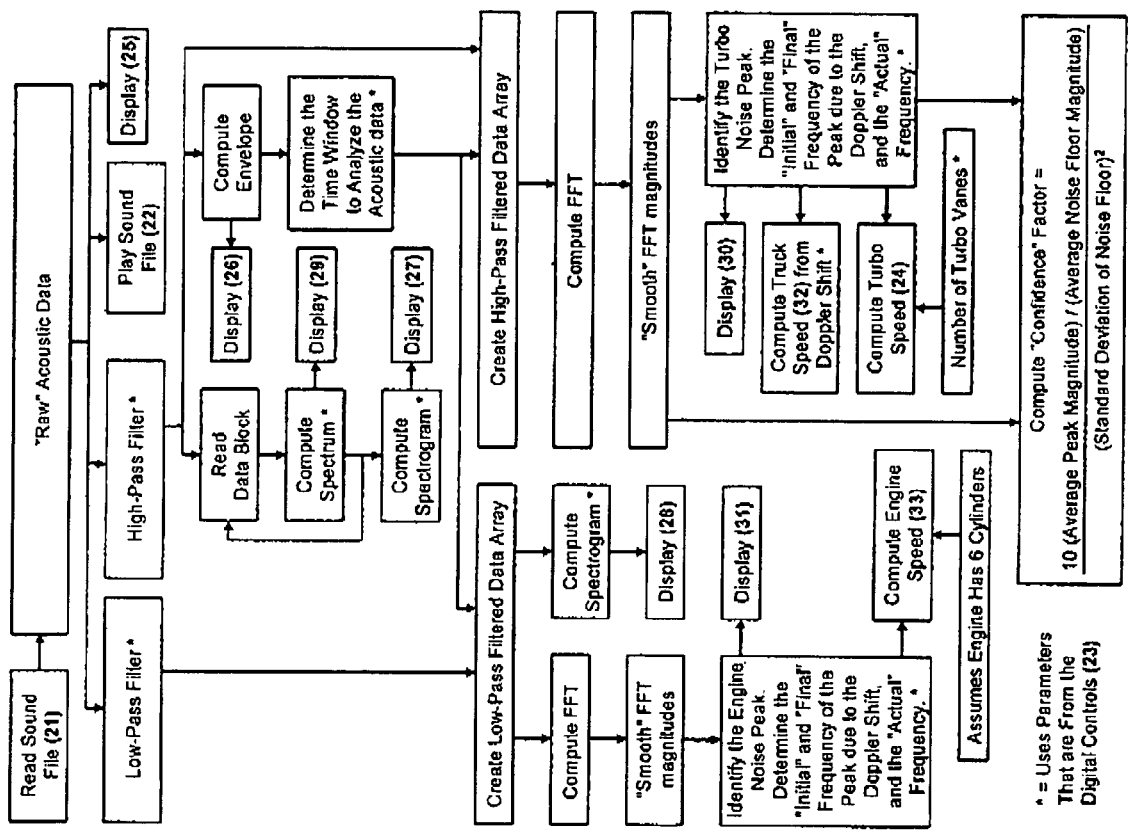
FIG. 6 is a flow chart of the software logic of the invention.
Figure 7:
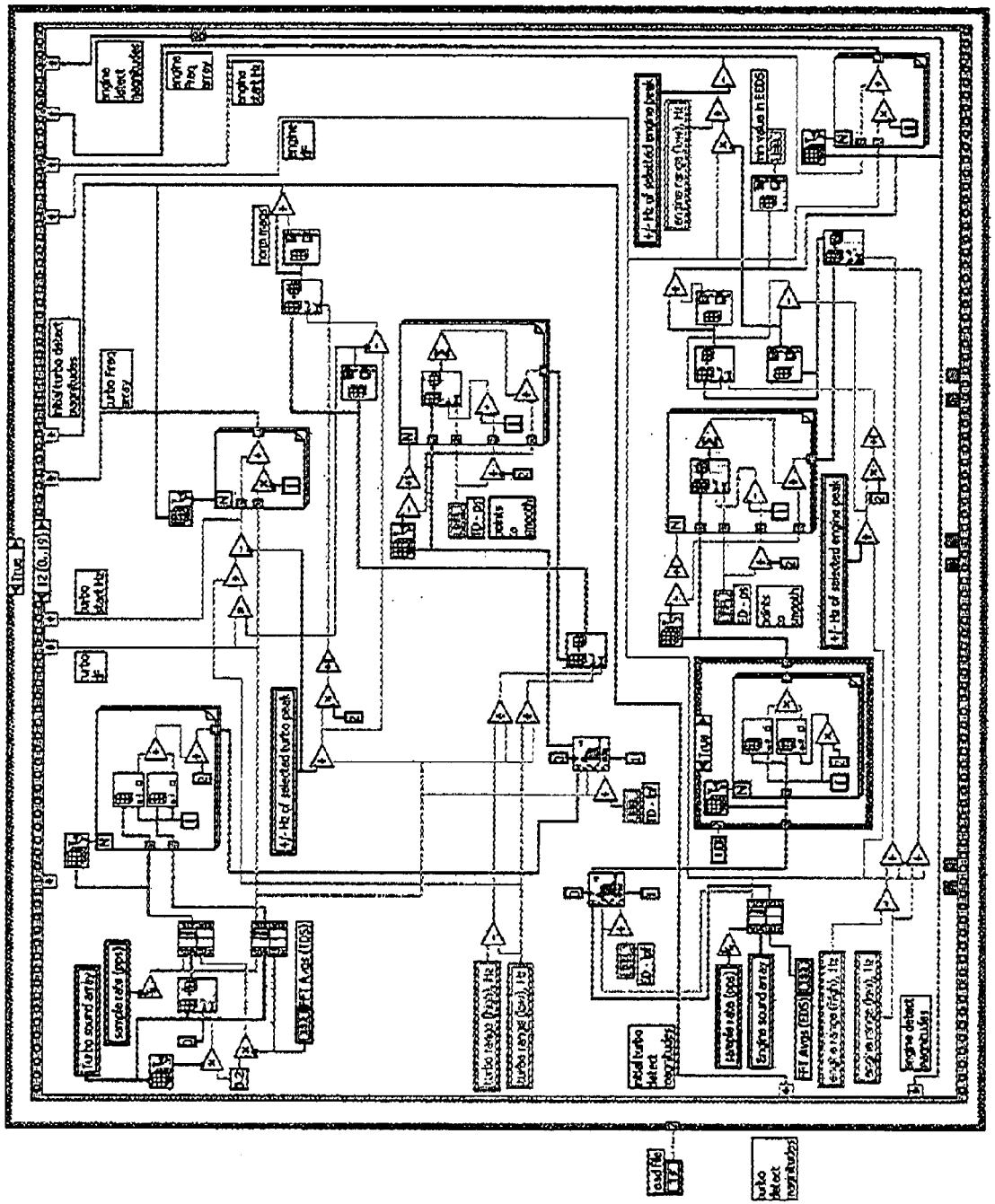
FIG. 7 is a small part of the TADA software code, written in LabVIEW.

The noncontact acoustic measurement and signature of this invention provides engine RPM, turbocharger rotation speed, and the speed of the moving vehicle on a highway. Using a flow map from Garrett, a major producer of turbochargers, an estimate of the horsepower (HP) as a function of estimated turbocharger rotation speed 24 for a typical engine can be determined from FIG. 5. The turbocharger effectively increases the horsepower over the rated value by increasing the pressure of the inlet air and hence increasing the amount of fuel that can be burned in a particular time. Within the limitations imposed by factors such as aerodynamic drag, slope of the highway θ, road surface, truck to truck engine differences and wind, the weight of a truck may be estimated using the equation:

$$M(\delta V/\delta t) = F - Mg \sin \theta$$

Where M is the mass of the truck, V is the velocity or estimated truck speed 32, δV/δt is the truck's acceleration, F is the vehicle drive force overcoming road slope and drag, and g is the gravitational constant. In a typical situation where a truck is going uphill at constant speed, the acceleration is 0 and the equation reduces to:

$$\delta V/\delta t = 0 \text{ and } F = Mg \sin \theta$$

Further, $$FV/V = Mg \sin \theta$$

And, $$HP/V = Mg \sin \theta$$

Knowing the road slope θ and calculating HP and V with the TADA system, the vehicle mass is estimated by:

$$M = HP/Vg \sin \Theta$$

This will be particularly useful in a location where road conditions are known or may be measured.

An 18 wheel tractor trailer with 80,000 lb gross weight will require 250 HP to maintain 55 mph on a straight and level road. This is the power required to overcome aerodynamic drag, tire rolling resistance, drive train losses, and accessories. Further, a truck turbocharger will range in rotation speed to 150,000 RPM, or 2562 Hz. This shaft rotation speed may be heard directly, or for a turbocharger with 11 blades, a vane pass frequency of 28,200 Hz might be detected using suitable equipment. The shaft frequency and its harmonics are within the bandwidth of typical acoustic collection equipment.

The TADA software was evaluated using 64 sound files that were recorded on four occasions at local highways. In all cases, truck-passing events were recorded as the trucks were driving uphill. Only one of these recordings was from a truck that was traveling at a known speed, and with a known engine speed. This case is described above and demonstrates the acceptable accuracy of the TADA software. For the other 63 truck passing events, the truck speeds were only visually estimated to range between 30 and 70 mph. Engine and turbocharger speeds were unknown for these trucks.

Figure 4:
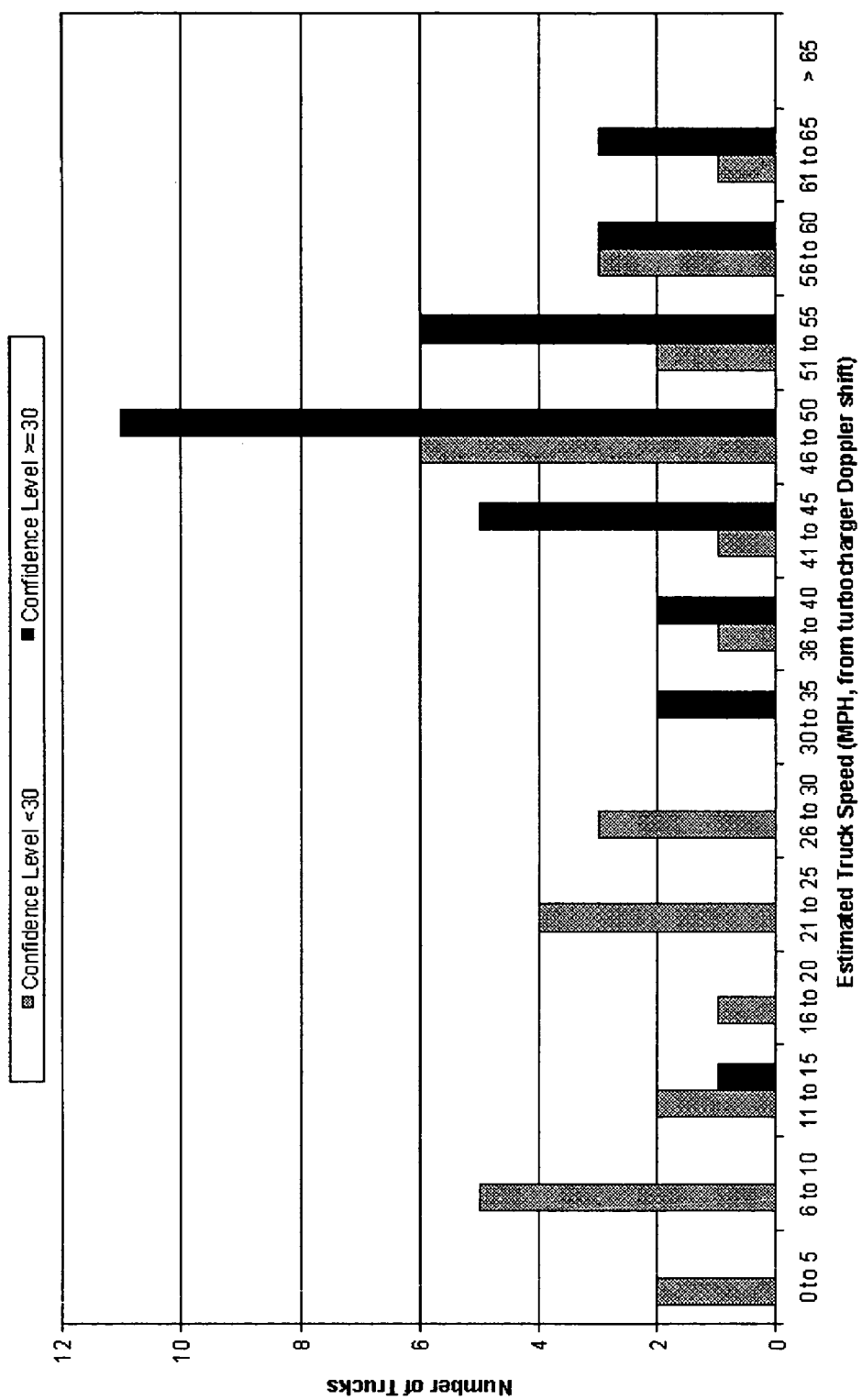
FIG. 4 illustrates the results from the TADA data quality calculation called the confidence level.

FIG. 4 illustrates the results from this evaluation. An important parameter in using the TADA is a data quality calculation called the "confidence level." The confidence level is an empirical measure of the signal-to-noise level of the turbocharger sound component found in the truck's audio signature. Higher confidence levels are associated with more reliable truck speed estimations.

As seen in FIG. 4, when examining all runs having a confidence level of approximately 30 or greater, a realistic truck speed was estimated on 32 out of 33 cases. Although the actual speeds are not known, this result is very encouraging.

The TADA system provides a means of measuring various speeds associated with a large truck (traveling speed, engine speed, and turbocharger speed) using specialized acoustic signature analysis methods. The incorporation of a data quality indicator (confidence level) minimizes incorrect measurements and insures that truck speeds are measured in a reliable manner.

In both the radar-based and laser-based speed measurement devices, energy is transmitted by the device and bounced off of the vehicle being monitored. These systems are called "active" systems, since they respond to a signal that is actively transmitted and received. Detectors are commercially available for people interested in knowing when their vehicle is being monitored by a radar or laser speed gun.

A very significant difference between conventional speed guns and the TADA system is that the speed detection is done without the speed detection equipment transmitting any energy that is bounced off of the vehicle. The TADA system is a "passive" system, because it only listens to the sounds that are already being transmitted by the vehicle itself. The person driving a vehicle being monitored by the TADA system is unaware that the speed of their vehicle is being measured.

Likewise, the TADA system now provides a means of remotely determining the speed of a truck engine, and the relative speed of its turbocharger (if used), without requiring access to a vibrating or rotating surface, as needed by vibration-based and strobe-tachometer-based systems for measuring rotational speed. This system also supports environmental/pollution studies in which non-intrusive monitoring of vehicle speed and loading is critical.

The TADA systems uses a passive method of measuring vehicle acoustic signature comprising the steps of; disposing at least one microphone in the acoustic field of a moving vehicle, connecting a computer to the output of the at least one microphone to detect and measure the frequency shift in the acoustic signature emitted by the vehicle as it approaches and passes the at least one microphone, and analyzing the acoustic signature to determine the real time state of the vehicle.

A single microphone can replace the dual-microphone that is illustrated in FIG. 1. It is feasible that the microphone already installed in a portable "laptop" computer will suffice. Therefore, the entire TADA system can be incorporated in a laptop computer for ease of use.

In addition, one or two microphones could be installed in street signs, or in other objects normally seen near a highway for purposes of concealment. The recording device can be a computer, a tape recorder, or other device. Vehicle acoustic signals can be analyzed in near-real time or recorded for later analysis.

The TADA system has several possible uses. An obvious application is as a new, undetectable vehicle speed gun used by law enforcement agencies. Since the acoustic signature contains detailed information not only about the speed of the vehicle, engine, and turbocharger, but also about the type of vehicle. It is likely that the TADA system can be the core of a new device for detecting the type of vehicle (e.g., tractor-trailer, dump truck, cement truck, etc.). This may have particularly important benefits in homeland security applications.

While there has been shown and described what are at present considered the preferred embodiments of the invention, it will be obvious to those skilled in the art that various changes and modifications can be made therein without departing from the scope.

We claim:

1. A passive turbocharcred vehicle acoustic data analyzer system comprising:
   at least two microphones disposed in the acoustic field of a moving vehicle,
   a computer in electronic communication with said at least two microphones wherein said computer detects and measures the frequency shift in the acoustic signature emitted by said vehicle as it approaches and passes said at least two microphones, wherein said acoustic signature is filtered and processed to determine an engine speed component and a turbocharger speed component for estimating said moving vehicle characteristics.

2. The system of claim 1 further comprising a means for estimating vehicle speed, engine speed, and turbocharger speed using the frequency shift in the acoustic signature.

3. The system of claim 2 further comprising a means for estimating vehicle weight using the road slope and calculated horsepower.

4. The system of claim 1 wherein said acoustic signature further comprises a mixed single channel signal further comprising a combination of signals from the at least two microphones.

5. The system of claim 1 further comprising a means for determining a confidence level data quality indicator using the noise floor and average peak magnitude.

6. A passive turbocharcred vehicle acoustic data analyzer system comprising:
   a single microphone disposed in the acoustic field of a moving vehicle,
   a computer in electronic communication with said single microphone wherein said computer detects and measures the frequency shift in the acoustic signature emitted by said vehicle as it approaches and passes said single microphone, wherein said acoustic signature is filtered and processed to determine an engine speed component and a turbocharger speed component for estimating said moving vehicle characteristics.

7. The system of claim 6 further comprising a means for estimating vehicle speed, engine speed, and turbocharger speed using the frequency shift in the acoustic signature.

8. The system of claim 7 further comprising a means for estimating vehicle weight using the road slope and calculated horsepower.

9. The system of claim S wherein said acoustic signature further comprises a monophonic sound file.

10. The system of claim 6 further comprising a means for determining a confidence level data quality indicator using the noise floor and average peak magnitude.

11. A passive method of measuring real time state of a moving turbocharged vehicle comprising the steps of:
    disposing at least one microphone in the acoustic field of a moving vehicle,
    connecting a computer to the output of said at least one microphone to detect and measure the frequency shift in the acoustic signature emitted by said vehicle as it approaches and passes said at least one microphone,
    analyzing said acoustic signature to determine the real time state of said vehicle, wherein said acoustic signature is filtered and processed to determine an engine speed component and a turbocharger speed component.

12. The method of claim 11 wherein said real time state further comprises truck speed, engine speed, and turbocharger speed using the frequency shift in the acoustic signature.

13. The method of claim 11 wherein said real time state further comprises a means for estimating the weight of said vehicle using the road slope and calculated horsepower.

14. The method of claim 11 wherein said at least one microphone comprises two or more microphones, and said acoustic signature further comprises a mixed single channel signal further comprising a combination of signals from the two or more microphones.

15. The method of claim 11 further comprising the step of determining a confidence level data quality indicator using the noise floor and average peak magnitude.

* * * * *